United States Patent
Park et al.

(10) Patent No.: US 8,902,189 B2
(45) Date of Patent: Dec. 2, 2014

(54) METHOD OF DETECTING TOUCH POSITIONS AND TOUCH POSITION DETECTION APPARATUS FOR PERFORMING THE METHOD

(75) Inventors: Se-Ki Park, Asan-si (KR); Sung-Kyu Lee, Suwon-si (KR); Yong-Woo Lee, Suwon-si (KR); Byung-Duk Yang, Yongin-si (KR); Dong-Min Yeo, Asan-si (KR)

(73) Assignee: Samsung Display Co., Ltd. (KR)

(*) Notice: Subject to any disclaimer, the term of this patent is extended or adjusted under 35 U.S.C. 154(b) by 779 days.

(21) Appl. No.: 12/568,909

(22) Filed: Sep. 29, 2009

(65) Prior Publication Data
US 2010/0265205 A1  Oct. 21, 2010

(30) Foreign Application Priority Data
Apr. 20, 2009  (KR) .............................. 2009-0034024

(51) Int. Cl.
G06F 3/045 (2006.01)
G06F 3/047 (2006.01)

(52) U.S. Cl.
CPC ................ *G06F 3/047* (2013.01); *G06F 3/045* (2013.01)
USPC ................. 345/174; 345/55; 345/92; 349/42; 349/73; 349/74; 349/139; 349/143; 257/72

(58) Field of Classification Search
USPC ............ 345/174, 55, 92; 349/42, 73, 74, 143, 349/149; 257/72
See application file for complete search history.

(56) References Cited

U.S. PATENT DOCUMENTS

| | | | | |
|---|---|---|---|---|
| 5,220,324 A | * | 6/1993 | Morita | 341/32 |
| 5,670,755 A | * | 9/1997 | Kwon | 178/18.05 |
| 5,792,997 A | * | 8/1998 | Fukuzaki | 178/18.07 |
| 6,239,788 B1 | * | 5/2001 | Nohno et al. | 345/173 |
| 6,933,976 B1 | * | 8/2005 | Suzuki | 348/315 |
| 7,119,870 B1 | * | 10/2006 | Nishikawa et al. | 349/125 |

(Continued)

FOREIGN PATENT DOCUMENTS

| | | |
|---|---|---|
| CN | 2671015 Y | 1/2005 |
| CN | 101286107 A | 10/2008 |

(Continued)

OTHER PUBLICATIONS

Machine translation of Japan publication 2000112642 by Miyahara Hideki on Apr. 21, 2000.*

*Primary Examiner* — Jason Olson
*Assistant Examiner* — Linh N Hoffner
(74) *Attorney, Agent, or Firm* — Cantor Colburn LLP

(57) ABSTRACT

A method of detecting touch positions includes; providing an external power voltage which drives a touch panel, sequentially turning on a plurality of lower driving elements connected to the touch panel, Turning on a plurality of upper driving elements connected to the touch panel to readout at least one multi-touched position corresponding to an x-coordinate, while each of lower driving elements is turned on, receiving readout position information corresponding to an x-coordinate, turning on at least one of the upper driving elements connected to the touch panel, turning on the plurality of lower driving elements connected to the touch panel to readout the at least one multi-touched position corresponding to a y-coordinate, while each of upper driving elements is turned on, receiving readout position information corresponding to the y-coordinate, turning on a sensing element, and turning off the sensing element.

11 Claims, 12 Drawing Sheets

(56) References Cited

U.S. PATENT DOCUMENTS

| | | |
|---|---|---|
| 7,304,629 B2 * | 12/2007 | Miyawaki et al. ............... 345/99 |
| 7,436,363 B1 * | 10/2008 | Klein et al. ............ 343/700 MS |
| 8,199,116 B2 * | 6/2012 | Jeon et al. ...................... 345/173 |
| 8,330,700 B2 * | 12/2012 | Yamanaka et al. ............. 345/100 |
| 8,405,622 B2 * | 3/2013 | Grivna ........................... 345/173 |
| 2005/0052605 A1 * | 3/2005 | Okumura ....................... 349/146 |
| 2008/0062139 A1 * | 3/2008 | Hotelling et al. .............. 345/173 |
| 2008/0218488 A1 * | 9/2008 | Yang et al. .................... 345/173 |
| 2008/0303802 A1 * | 12/2008 | Destura et al. ................. 345/175 |

FOREIGN PATENT DOCUMENTS

| | | |
|---|---|---|
| JP | 01260520 A | 10/1989 |
| JP | 06067789 A | 3/1994 |
| JP | 11305932 A | 11/1999 |
| JP | 2000112642 A | 4/2000 |
| JP | 2006201763 A | 8/2006 |
| JP | 2007095044 A | 4/2007 |
| JP | 2009282825 A | 12/2009 |

* cited by examiner

METHOD OF DETECTING TOUCH POSITIONS AND TOUCH POSITION DETECTION APPARATUS FOR PERFORMING THE METHOD

This application claims priority to Korean Patent Application No. 2009-34024, filed on Apr. 20, 2009, and all the benefits accruing therefrom under 35 U.S.C. §119, the contents of which in its entirety is herein incorporated by reference.

BACKGROUND OF THE INVENTION

1. Field of the Invention

Exemplary embodiments of the present invention relate to a method of detecting touch positions and a touch position detection apparatus for performing the method. More particularly, exemplary embodiments of the present invention relate to a method of detecting touch positions capable of synchronously, e.g., simultaneously, recognizing a plurality of touch positions and a touch position detection apparatus for performing the method.

2. Description of the Related Art

Display devices capable of processing and displaying large amounts of information are being developed due to progression toward an information-oriented society.

To efficiently use electronic equipment, touch panels, which allow signals to be input through display surfaces of a display device without a separate input device such as a remote control, are becoming more widely used. For example, touch panels may be included on the display surfaces of electronic diaries, liquid crystal display ("LCD") devices, e-readers, image display devices, and other similar devices.

As briefly discussed above, a touch panel is an input means capable of substituting for conventional input means such as a mouse or keyboard, specifically the typical touch panel is an information input means capable of allowing information to be directly input on a screen using physical contact, e.g., by a hand or a pen. A touch panel is considered to be an ideal information input means because it can be easily and intuitively operated. Recently, the touch panel has been employed in personal electronic equipment such as cellular phones, personal digital assistants ("PDAs"), and other similar devices, and is also used in commercial activities, e.g., by major companies such as banks and public offices.

Touch panels may be classified by their type of operation into capacitive type, resistive type, electromagnetic ("EM") type, and other types of touch panels.

A basic concept of the capacitive-type touch panel is that a film having an electrode thereon is mounted on a liquid crystal panel and a voltage is applied to each corner of the film to generate a uniform electrical field in the electrode. When a finger or a conductive pen is touched on the electrode, a voltage drop is generated at the location of the finger or conductive pen, and that voltage drop is used to detect position coordinates of the touch location.

In addition, a basic concept of the typical resistive-type touch panel is that an upper transparent substrate having an upper electrode, displaying an image and providing a touch area, and a lower transparent substrate having a lower electrode and facing the upper transparent substrate occupy a predetermined space and are laminated. When the input means, such as a pen or finger, is touched at one position of the upper transparent substrate, the touch deforms one or both of the upper and lower substrates and the upper electrode in the upper transparent substrate and the lower electrode in the lower transparent substrate are contacted and apply an electrical current to each other via the contacting area. Accordingly, a voltage change according to a resistive value of the position is recognized, and detecting the position coordinates may be detected according to the voltage change in a control device of the touch panel.

Generally, the resistive-type touch panel is used as a touch panel input device recognizing the touch of a pen or finger. As described above, the resistive type recognizes a touch based on a surface resistance between the upper electrode and the lower electrode. When at least two touches are generated, e.g., when multiple contacts are made between the upper and lower substrates, a conventional resistive-type touch panel using whole plate electrodes as the upper electrode and the lower electrode may undesirably recognize an average electrical potential between the at least two touches rather than individually recognizing the multiple touches. Accordingly, a point in the middle of the at least two touches may be misrecognized as a touched position while the at least two touches may not be accurately recognized as multiple touched positions.

BRIEF SUMMARY OF THE INVENTION

Exemplary embodiments of the present invention provide a method of detecting touch positions capable of accurately recognizing a plurality of touch positions by using a resistive method.

Exemplary embodiments of the present invention also provide a touch position detection apparatus for performing the above-mentioned method.

According to one exemplary embodiment of the present invention, a method of detecting touch positions includes providing an external power voltage which drives a touch panel, Sequentially turning on a plurality of lower driving elements connected to the touch panel, turning on a plurality of upper driving elements connected to the touch panel to readout at least one multi-touched position corresponding to an x-coordinate, while each of the lower driving elements is turned on, receiving readout position information corresponding to the x-coordinate, sequentially turning on at least one of the upper driving elements connected to the touch panel, turning on the plurality of lower driving elements connected to the touch panel to readout the at least one multi-touched position corresponding to a y-coordinate, while each of the upper driving elements is turned on, receiving readout position information corresponding to the y-coordinate, turning on a sensing element, and turning off the sensing element.

In an exemplary embodiment of the present invention, turning on the sensing element includes; converting the readout position information corresponding to the x-coordinate and the position information corresponding to the y-coordinate into at least one digital position value, processing the at least one digital position value may be calculated to obtain the at least one multi-touched position, and transmitting the at least one multi-touched position to a system which controls the driving of a display panel disposed below the touch panel.

According to another exemplary embodiment of the present invention, a touch position detection apparatus includes; a touch panel including; a lower substrate including a plurality of first electrodes arranged in a first direction, an upper substrate including a plurality of second electrodes arranged in a second direction substantially perpendicular to the first direction, and a plurality of spacers disposed between the lower substrate and the upper substrate, and a touch panel driving device includes; a driving element part which drives the plurality of first electrodes and the plurality of second electrodes, and a sensing element part which senses at least one touch performed on the touch panel in response to the driving element part, wherein the sensing element part sequentially reads out voltages of the plurality of second electrodes while each of the first electrodes is driven.

In an exemplary embodiment of the present invention, the driving element part may include; a plurality of lower driving elements respectively connected to the plurality of first electrodes arranged in the second direction, and a plurality of upper driving elements respectively connected to the plurality of second electrodes arranged in the second direction.

In an exemplary embodiment of the present invention, the sensing element part may include; a sensing resistor, and a sensing element which maintains a low voltage while the at least one touch is sensed by the driving element part and which maintains a high voltage after the at least one touch is sensed by the driving element part.

In an exemplary embodiment of the present invention, the touch position detection apparatus may further include; a touch panel control section which controls the touch panel driving device to sequentially drive the plurality of first electrodes and the plurality of second electrodes, wherein the touch panel control section includes; an analog-to-digital converter ("ADC") which converts an analog position value received form the touch panel driving device into a digital position value, and a microcontroller which processes the digital position value received from the ADC to detect at least one touch position.

According to still another exemplary embodiment of the present invention, a method of detecting touch positions includes; providing a driving pulse which drives a touch panel to a lower time delay wiring portion connected to the touch panel, providing a first reading pulse to an upper time delay wiring portion connected to the touch panel during a time interval in which the driving pulse is providing to the lower time delay wiring portion, receiving readout position information corresponding to an x-coordinate according to the first reading pulse, providing the driving pulse to the upper time delay wiring portion connected to the touch panel in response to the readout position information corresponding to an x-coordinate, providing a second reading pulse to the lower time delay wiring portion connected to the touch panel during a time interval in which the driving pulse is provided to the upper time delay wiring portion, receiving readout position information corresponding to a y-coordinate according to the second reading pulse, and calculating position information corresponding to the x-coordinate and the y-coordinate to detect at least one touch position.

According to still another exemplary embodiment of the present invention, a touch position detection apparatus includes; a touch panel including a lower substrate including a plurality of first electrodes arranged in a first direction, an upper substrate including a plurality of second electrodes arranged in a second direction and a plurality of spacers disposed between the lower substrate and the upper substrate, a touch panel driving device including a plurality of delay wiring parts which delay a driving pulse applied to each of the plurality of first electrodes and the plurality of second electrodes to sequentially drive the plurality of first electrodes and the plurality of second electrodes, and a touch panel control part which applies the driving pulse to the touch panel driving device.

In an exemplary embodiment of the present invention, the plurality of delay wiring parts include; a plurality of lower time delay wiring portions connected to the plurality of first electrodes, and a plurality of upper time delay wiring portions connected to the plurality of second electrodes.

In an exemplary embodiment of the present invention, the plurality of lower time delay wiring portions and the plurality of upper time delay wiring portions include a plurality of twisted pattern wirings, and the plurality of twisted pattern wirings are sequentially connected to the plurality of first electrodes and the plurality of second electrodes to sequentially delay the driving pulse applied to the plurality of first electrodes and the plurality of second electrodes.

In an exemplary embodiment of the present invention, the plurality of lower time delay wiring portions and the plurality of upper time delay wiring portions include a plurality of twisted pattern wirings, and the plurality of twisted pattern wirings are randomly connected to the plurality of first electrodes and the plurality of second electrodes to randomly delay the driving pulse applied to the plurality of first electrodes and the plurality of second electrodes.

According to an exemplary embodiment of a method of detecting touch positions and an exemplary embodiment of a touch position detection apparatus for performing the method, a driving voltage and a reading voltage are sequentially applied to a plurality of first electrodes and a plurality of second electrodes, thereby accurately recognizing multi-touched positions where a touch panel is simultaneously touched in multiple locations, e.g., multi-touched.

In addition, in one exemplary embodiment only a layout of wirings connected to the first electrodes and the second electrodes is changed to delay pulses applied to the first electrodes and the second electrodes by a predetermined time, thereby reducing unnecessary elements to reduce manufacturing costs.

In addition, in one exemplary embodiment a voltage is not applied to the first electrodes and the second electrodes, but a pulse is applied to the first electrodes and the second electrodes to readout values in x-axis and y-axis nearly at substantially the same time, thereby reducing a driving time and accurately recognizing multi-touches.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
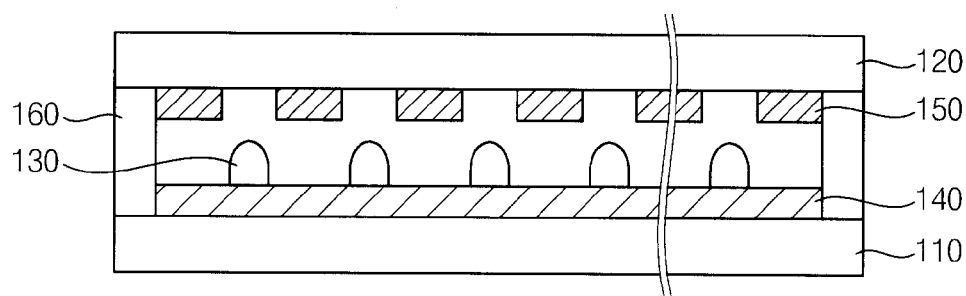
FIG. 1 is a cross-sectional view illustrating an exemplary embodiment of a touch panel according to the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. Like reference numerals refer to like elements throughout.

It will be understood that when an element or layer is referred to as being "on" another element, it can be directly on the other element or intervening elements may be present. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

FIG. 1 is a cross-sectional view illustrating an exemplary embodiment of a touch panel 100 according to the present invention.

Referring to FIG. 1, the present exemplary embodiment of a touch panel 100 includes a lower substrate 110, an upper substrate 120 and a spacer 130.

A plurality of first electrodes 140 is formed on the lower substrate 110, the plurality of first electrodes 140 being arranged substantially parallel to one another in a first direction. Exemplary embodiments of the first electrodes 140 may have a stripe shape or a rectangular shape. The first electrodes 140 are arranged in the first direction (that is, a width direction of the first electrode 140); as shown in FIG. 1, a direction of extension of the plurality of first electrodes is substantially the same as the direction from which the cross-sectional view is taken so that the first electrode 140 extends along the width of the cross-sectional view of FIG. 1. Exemplary embodiments of the lower substrate 110 may include glass, plastic, polyethylene terephthalate ("PET"), and various other similar materials. Exemplary embodiments of the first electrodes 140 may include an optically transparent and electrically conductive material such as indium tin oxide ("ITO") or indium zinc oxide ("IZO") and other materials having similar characteristics.

A plurality of second electrodes 150 is formed on the upper substrate 120, and is arranged in a second direction substantially perpendicular to the first direction. In one exemplary embodiment, the upper substrate 120 may include an optically transparent and electrically conductive material such as PET. In one exemplary embodiment the upper substrate 120 is pressed by a pen or finger in operation of the device. Exemplary embodiments of the second electrode 150 may include an optically transparent and electrically conductive material such as ITO or IZO and other materials having similar characteristics.

In one exemplary embodiment, the lower substrate 110 and the upper substrate 120 are adhered by adhesives 160 in an outer area which is a non-touch area in which the first electrode 140 and the second electrode 150 are not formed. Accordingly, a space distance between the lower substrate 110 and the upper substrate 120 may be set based on the height of the adhesives 160. Alternative exemplary embodiments include configurations wherein the lower substrate 110 and the upper substrate 120 are joined by alternative methods.

The spacer 130 is disposed between the lower substrate 110 and the upper substrate 120 to maintain a predetermined gap between the first electrode 140 and the second electrode 150. Each of the spacers 130 is spaced apart from each other by a certain distance. For example, in one exemplary embodiment the spacer 130 may be formed on the first electrode 140 of the lower substrate 110. In another exemplary embodiment, the spacer 130 may be formed on the upper substrate 120. Alternative exemplary embodiments include configurations wherein the spacer 130 may be formed below the first electrode 140. Exemplary embodiments include configurations wherein the spacer 130 may includes an insulation resin such as epoxy, acrylic, and other similar materials.

Figure 2:
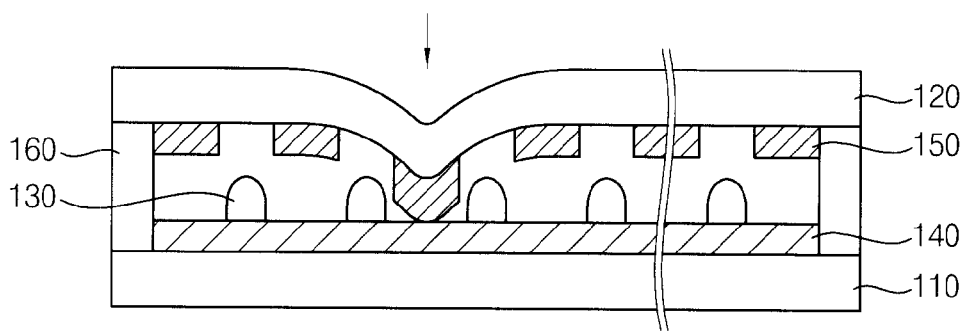
FIG. 2 is a cross-sectional view illustrating an exemplary embodiment of the operation of the touch panel of FIG. 1.

FIG. 2 is a cross-sectional view illustrating an exemplary embodiment of the operation of the touch panel of FIG. 1.

Referring to FIGS. 1 and 2, when the upper substrate 120 is pressed by a pen or finger or other similar component, the second electrode 150 contacts the first electrode 140. The first electrode 140 contacts the second electrode 150, so that a resistance value across the second electrode 150 may be changed, and thus a voltage thereof may be changed.

Accordingly, a position touched by the pen or the finger may be detected by a changed voltage; such a position is hereinafter referred to as a "touched position". In one exemplary embodiment, the second electrode 150 and the upper substrate 120 are deformed by a pressure applied thereto by the pen or the finger in order to decrease a distance between the first electrode 140 and the second electrode 150.

A conventional resistive type touch position detection apparatus recognizes the touched position by a surface resistance in accordance with positions of the electrodes, using a single lower electrode and a single upper electrode. Accordingly, when at least two positions are multi-touched, an average electric potential is recognized.

However, the touch panel 100 according to the present exemplary embodiment includes a plurality of lower electrodes 140 and a plurality of upper electrodes 150, thereby solving the problem of a conventional resistive touch position detection apparatus.

Figure 3:
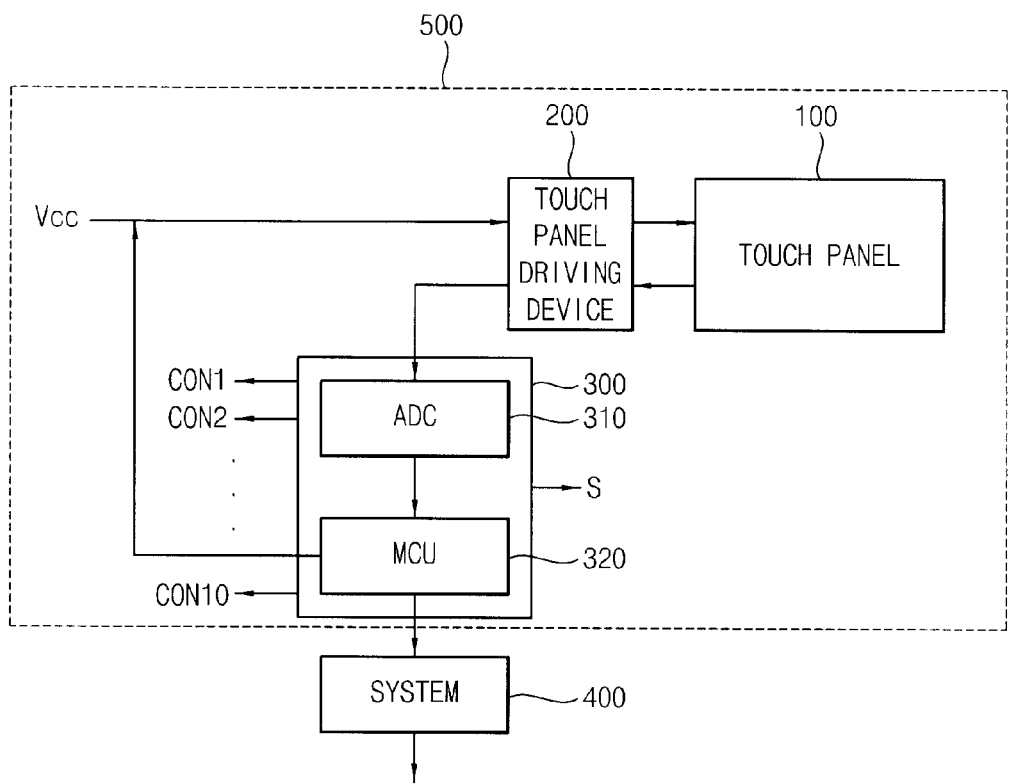
FIG. 3 is a block diagram illustrating an exemplary embodiment of a touch position detection apparatus according to the present exemplary embodiment.

FIG. 3 is a block diagram illustrating an exemplary embodiment of a touch position detection apparatus 500 according to the present exemplary embodiment.

Referring to FIGS. 1 to 3, the touch position detection apparatus 500 includes the touch panel 100, a touch panel driving device 200 and a touch panel control section 300.

The touch panel 100 includes the first electrode 140 and the second electrode 150 disposed substantially perpendicularly to the first electrode 140, as described with reference to FIGS. 1 and 2.

The touch panel driving device 200 includes a driving element part (not shown) and a sensing element part (not shown). A voltage Vcc applied from an external device (not shown) is applied to the touch panel driving device 200 on the upper substrate 120 of the touch panel 100. Thus, the touch panel driving device 200 applies the voltage to the plurality of first electrodes 140 and scans the plurality of second electrodes 150 to recognize touched positions on the upper substrate 120.

The voltage Vcc is applied to the touch panel driving device 200 by the touch panel control section 300 when the upper substrate 120 of the touch panel 100 is touched. In addition, the touch panel control section 300 provides control signals CON1 to CON10 and S for controlling the driving element part and the sensing element part of the touch panel driving device 200. Thus, the touch panel control section 300 may control the touch panel driving device 200.

The touch panel control part 300 includes an analog-to-digital converter ("ADC") 310 and a microcontroller ("MCU") 320. The ADC 310 converts an analog value collected when a certain voltage difference is generated in the touch panel 100 into a digital value corresponding to the analog value. The MCU 320 processes the digital value to detect positions in which the voltage difference is generated. In one exemplary embodiment the MCU 320 calculates the digital value to detect positions in which the voltage difference is generated.

Figure 4:
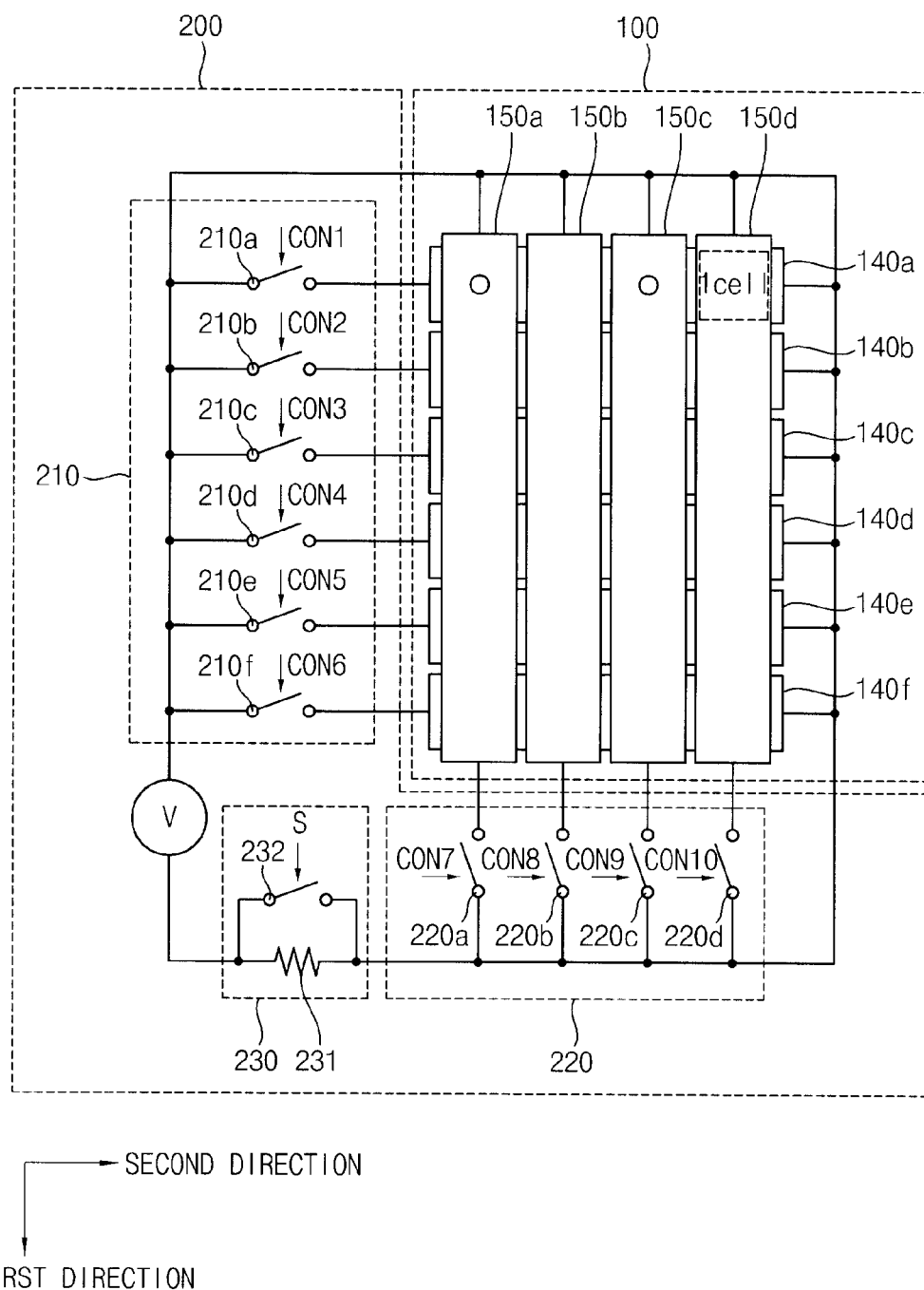
FIG. 4 is a detailed view illustrating an exemplary embodiment of a touch panel driving device connected to the touch panel according to an exemplary embodiment of FIG. 3.

FIG. 4 is a detailed view illustrating an exemplary embodiment of a touch panel driving device 200 connected to the touch panel 100 according to FIG. 3.

Referring to FIGS. 1 to 4, the touch panel driving device 200 connected to the touch panel 100 according to the present exemplary embodiment includes a lower driving element part 210, an upper driving element part 220 and the sensing element part 230.

The lower driving element part 210 is connected to the plurality of first electrodes 140 arranged in the first direction.

The upper driving element part 220 is connected to the plurality of second electrodes 150 arranged in the second direction substantially perpendicular to the first electrode 140 arranged in the first direction.

The sensing element part 230 includes a sensing resistor 231 and a sensing element 232. The sensing resistor 231 recognizes the voltage difference generated when the second electrode 150 is touched with the first electrode 140, e.g., a current passing through the sensing resistor 231 corresponds to a voltage difference between ends of the sensing resistor 231, and the voltage difference between ends of the sensing resistor 231 may be varied depending upon whether or not any of the plurality of first electrodes 140 and any of the plurality of second electrodes 150 contact one another. The sensing element 232 is maintained at a low level while touch positions are sensed by the driving element parts 210 and 220 and is maintained at a high level after the sensing by the driving element parts 210 and 220 is finished, thereby sensing the voltage difference by the sensing resistor 231. In one exemplary embodiment, the sensing element 232 may be a switch which is maintained in an open state when the touch positions are sensed by the driving element parts 210 and 220 and may be in a closed state after the sensing by the driving element parts 210 and 220 is finished. In such an exemplary embodiment, the sensing resistor 231 may be effectively shorted when the switch 232 is closed.

In addition, the touch panel 100 includes a plurality of unit cells where the first electrode 140 and the second electrode 150 crossing the first electrode 140. The first electrode and the second electrode 150 may be contacted (connected) to each other by a touch event using a finger or pen.

Figure 5:
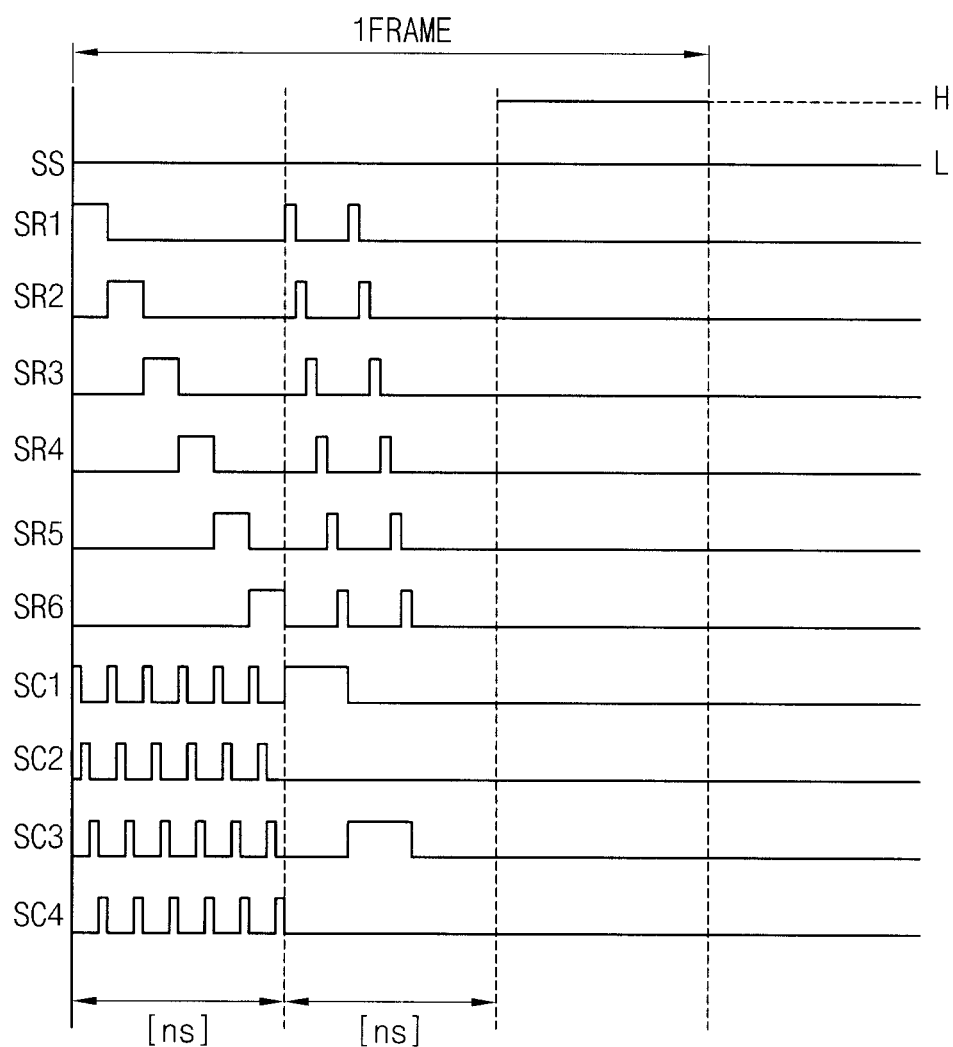
FIG. 5 is a timing diagram showing an exemplary embodiment of a signal applied to the touch panel according to the driving of a touch position detection apparatus of FIG. 4.

FIG. 5 is a timing diagram showing exemplary embodiments of a signal applied to the touch panel according to the driving of a touch position detection apparatus of FIG. 4.

To easily explain the present exemplary embodiment, the operation of the touch position detection apparatus 500 connected to the touch panel 100 having six first electrodes 140 and four second electrodes 150 disposed substantially perpendicular to the first electrodes 140 will be explained with reference to FIGS. 1 to 5.

According to the present exemplary embodiment, from a viewpoint of the unit cell of the touch panel 100, a touch area of a 6×4 matrix may be detected.

For example, an exemplary embodiment in which multi-touches, e.g., multiple touch positions, are generated at positions of first row and first column (1, 1) and first row and third column (1, 3) in the touch panel 100 will be explained. For ease of explanation, these multi-touches are indicated by circles on the second electrodes 150a and 150c in FIG. 4.

First, when the touch panel control section 300 recognizes the multi-touches, the touch panel control section 300 sequentially applies the voltage to lower driving elements 220a through 220d of the touch panel driving device 200.

Referring to FIGS. 4 and 5, a first lower driving element 210a connected to the first electrode 140a of a first row is turned on (SR1), the voltage is applied to the first electrode 140a of the first row. When the first lower driving element 210a is turned on, the upper driving element part 220 receives a reading signal from the touch panel control section 300 to sequentially readout the second electrode 150a of a first row, the second electrode 150b of a second row, the second electrode 150c of a third row and the second electrode 150d of a fourth row. Here, when the second electrode 150a of the first row is readout, the second electrode 150a of the first row is in contact with the first electrode 140a of the first row and a certain voltage is dropped, e.g., a resistance of the second electrode 150a is greater than a resistance of a path the current would travel if the second electrode 150a were not contacted with the first electrode 140a. The sensing resistor 231 recognizes the voltage drop, e.g., the change in voltage may be detected at the sensing resistor 231. Thus, it is recognized that one touch is generated at the position of the first row and the first column (1, 1) of the touch panel 110.

In addition, when the second electrode 150c of the third row is readout, the second electrode 150c of the third row contacts with the first electrode 140a of the first row and a certain voltage is dropped, e.g., a resistance of the second electrode 150c is greater than a resistance of a path the current would travel if the second electrode 150c were not contacted with the first electrode 140a. Thus, the sensing resistor 231 may recognize the voltage drop, e.g., the change in voltage may be detected at the sensing resistor 231. Therefore, it is recognized that another touch is generated at the position of the first row and the third column (1, 3) of the touch panel 110.

Here, the touch panel control part 300 maintains the sensing element 232 in a turned-off state, e.g., in the exemplary embodiment wherein the sensing element 232 is a switch, it may be in an open state.

In addition, the second lower driving element 210b connected to the first electrode 140b of the second row is turned on, and a voltage is applied to the first electrode 140b of the second row. When the second lower driving element 210b is turned on, the upper driving element part 220 receives the reading signal from the touch panel control section 300, so that the second electrodes 150 are sequentially readout from the first row to the fourth row. Here, the touch panel control section 300 maintains the sensing element 232 in the turned-off state.

In addition, the third lower driving element 210c connected to the first electrode 140c of the third row is turned on, and the voltage is applied to the first electrode 140c of the third row. When the third lower driving element 210c is turned on, the upper driving element part 220 receives the reading signal from the touch panel control section 300, so that the second electrodes 150 are sequentially readout from the first row to the fourth row. Here, the touch panel control section 300 maintains the sensing element 232 in the turned-off state.

In addition, the fourth lower driving element 210d connected to the first electrode 140d of the fourth row is turned on, the voltage is applied to the first electrode 140d of the fourth row. When the fourth lower driving element 210d is turned on, the upper driving element part 220 receives the reading signal from the touch panel control section 300, so that the second electrodes 150 are sequentially readout from the first row to the fourth row. Here, the touch panel control section 300 maintains the sensing element 232 in the turned-off state.

In addition, the fifth lower driving element 210e connected to the first electrode 140e of the fifth row is turned on, and the voltage is applied to the first electrode 140d of the fifth row. When the fifth lower driving element 210e is turned on, the upper driving element part 220 receives the reading signal from the touch panel control section 300, so that the second electrodes 150 are sequentially readout from the first row to the fourth row. Here, the touch panel control section 300 maintains the sensing element 232 in the turned-off state.

In addition, the sixth lower driving element 210f connected to the first electrode 140f of the sixth row is turned on, and the voltage is applied to the first electrode 140f of the sixth row. When the sixth lower driving element 210f is turned on, the upper driving element part 220 receives the reading signal from the touch panel control section 300, so that the second electrodes 150 are sequentially readout from the first row to the fourth row. Here, the touch panel control section 300 maintains the sensing element 232 in the turned-off state.

Thus, according to the operation, it is confirmed that there are a first touch and a second touch at the first row and the first column (1, 1) and the first row and the third column (1, 3). As described above, the lower driving elements 210a-f are sequentially turned on and the upper driving element part 220 sequentially receives the reading signal from the touch panel control section 300 so that the second electrodes 150 are sequentially read out once during each turn on period of the driving elements 210a-f.

Next, the touch panel control section 300 sequentially applies the voltages to the upper driving elements 220 of the touch panel driving device 200.

First, the first upper driving element 220a connected to the second electrode 150a of the first column is turned on, and a voltage is applied to the second electrode 150a of the first column. When the first upper driving element 220a is turned on, the lower driving element part 210 receives the reading signal from the touch panel control section 300, so that the first electrodes 140 are sequentially readout from the first row to the sixth row. Thus, it is recognized that there is the first touch by the voltage drop in the first row and the first column (1, 1). Here, the touch panel control section 300 maintains the sensing element 232 in the turned-off state.

In one exemplary embodiment, since the voltage drop is not generated in the second electrode 150b of the second column when the first electrode 140 is driven, the driving of the second electrode 150b of the second row may be omitted. Thus, the driving time for recognizing a touched position may be reduced. As shown in FIG. 5, only the second electrode 150a of the first column and the second electrode 150c of the third column are driven.

In addition, the third upper driving element 220c connected to the second electrode 150c of the third row is turned on, and the voltage is applied to the second electrode 150c of the third row. When the third upper driving element 220c is turned on, the lower driving element 210 receives the reading signal from the touch panel control section 300, so that the first electrodes 140 are sequentially readout from the first row to the sixth row. Therefore, it is recognized that there is the second touch due to the voltage drop in the first row and the third row (1, 3). Here, the touch panel control section 300 maintains the sensing element 232 in the turned-off state.

In one exemplary embodiment, since the voltage drop is not generated in the second electrode 150d of the fourth row when the first electrode 140 is driven, the driving of the second electrode 150b of the fourth row may be omitted. Thus, the driving time for recognizing a touched position may be reduced. Alternative exemplary embodiments include configurations wherein each of the lower driving elements 220a-d is sequentially activated.

Next, when the operation is finished by the driving elements (210a to 210f and 220a to 220d), the touch panel control section 300 turns on the sensing element 232. When the sensing element 232 is turned on, the analog position values acquired by the operation are converted into the digital position values in the ADC 310. The converted digital position is provided to the MCU 320, the MCU 320 calculates multi-touched positions based on the digital position values. For example, in one exemplary embodiment in the interval where the sensing element 232 has a high level, the MCU 320 calculates the multi-touched positions. Next, the MCU 320 may provide the calculated position information to the system 400 driving the liquid crystal panel (not shown).

In the present exemplary embodiment all of the above operations are performed in one frame, which sense the multi-touched positions by the driving elements 210a to 210f and 220a to 220d and calculate the positions by the MCU 320. Alternative exemplary embodiments include configurations wherein the above operations may be spread over multiple frames.

In the present exemplary embodiment, the driving elements 210a to 210f and 220a to 220d are driven in MHz units, e.g., cycles lasting only millionths of a second, so that a time for sensing the positions by the driving elements 210a to 210f and 220a to 220d requires only nanoseconds. Thus, time for calculating the sensed positions in the MCU 320 may be sufficiently secured.

For example, in one exemplary embodiment while milliseconds are required to recognize the touched positions during one frame according to a conventional technology, in the present exemplary embodiment only nanoseconds elapse while the touch positions of a single frame are recognized, e.g., a nanosecond scale time used by the lower driving elements 210a to 210f is added to a nanosecond scale time used by the upper driving elements 220a to 220d, is used to recognize the touched positions during one frame according to the present exemplary embodiment. Though the time used by the driving elements 210a to 210f and 220a to 220d is added to the time used to detect the sensed positions by the sensing element 232, the total time according to the present exemplary embodiment may be less than the total time of a conventional technology or similar to the total time of a conventional technology.

In addition, in one exemplary embodiment the driving elements 210a to 210f and 220a to 220d and the sensing element 232 may be formed exterior to the touch panel 100.

Thus, field-effect transistors ("FETs") having a plurality of channels may be used as the driving elements 210a to 210f and 220a to 220d and the sensing element 232. However, alternative exemplary embodiments of the driving elements 210a to 210f and 220a to 220d and the sensing element 232 may be built-in.

Figure 6:
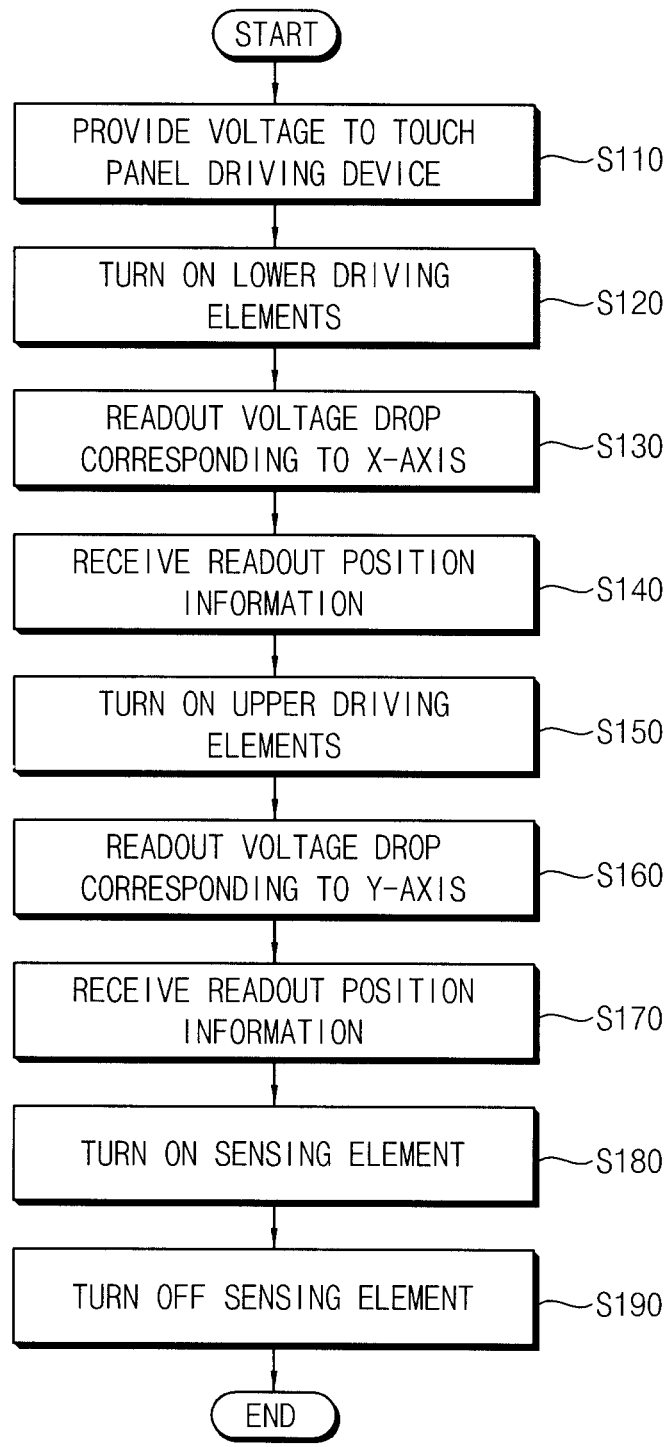
FIG. 6 is a flowchart illustrating an exemplary embodiment of a method of detecting touch positions according to the present exemplary embodiment.

FIG. 6 is a flowchart illustrating an exemplary embodiment of a method of detecting touch positions.

Referring to FIGS. 1 to 6, the operation of detecting touches generated in the touch panel 100 will be explained.

According to the present exemplary embodiment, when the upper substrate 120 is touched, e.g., pressed by a pen or finger, as described with reference to FIG. 2, the second electrode 150 formed on the upper substrate 120 contacts the first electrode 140 formed on the lower substrate 110. Since a variation of the voltage applied to either the first electrode 140 or the second electrode 150 is generated, the touch panel control section 300 recognizes that at least one touch is generated.

When the touch panel control section 300 recognizes the at least one touch by a certain voltage drop, the touch panel control section 300 provides an external power voltage for driving the touch panel to the touch panel driving device 200 in response to the at least one touch (step S110). The touch panel control section 300 may respectively supply certain voltages having different levels to the first electrode 140 and the second electrode 150 during every frame, regardless of generating of a certain touch. Thus, the first electrode 140 is contacted to the second electrode 150 by the at least one touch, so that a voltage drop is generated and the touch panel control section 300 may recognize the voltage drop.

Next, the lower driving elements 210 connected to the first electrodes 140 formed on the lower substrate 110 are sequentially turned on based on a provided external power voltage (step S120). While each of the lower driving elements 210 is turned on, the upper driving elements 220 connected to the second electrodes 150 formed on the upper substrate 120 are sequentially turned on, e.g., for each of the lower driving elements 210 all of the upper driving elements 220 are sequentially turned on, thereby reading out the positions where the voltage drops are generated corresponding to an x-coordinate (step S130).

Readout position information is transmitted to the touch panel control section 300 (step S140).

Based on the position information transmitted to the touch panel control section 300, the upper driving elements 220 connected to the second electrodes 150 formed on the upper substrate 110 are selectively turned on (step S150). In step S150, while each of selected upper driving elements 220 is turned on, the lower driving elements 210 connected to the first electrodes 150 formed on the lower substrate 110 are sequentially turned on, e.g., all of the lower driving elements 210 is turned on for each of the selected upper driving elements 220 that is turned on, thereby reading out the positions where the voltage drops are generated corresponding to a y-coordinate (step S160).

Readout position information is transmitted to the touch panel control section 300 (step S170).

Next, the sensing element 232 is turned on (step S180).

Figure 7:
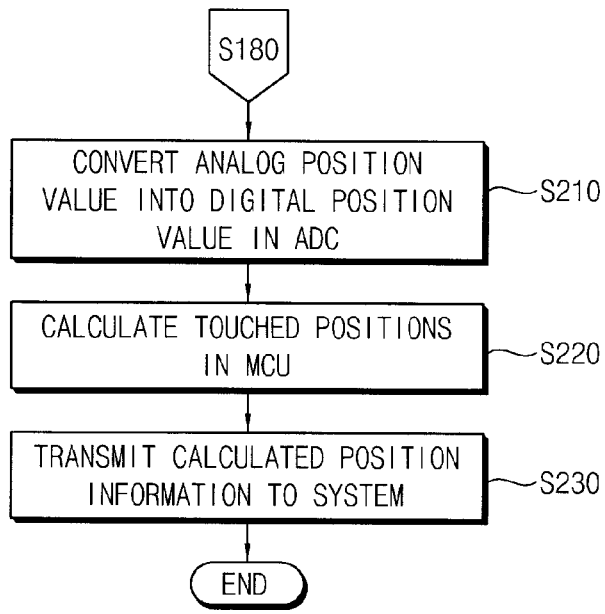
FIG. 7 is a flowchart illustrating an exemplary embodiment of the operation of elements of a touch panel control section according to step S180 of FIG. 6.

FIG. 7 is a flowchart showing an exemplary embodiment of the operation of elements of an exemplary embodiment of a touch panel control section 300 according to step S180 of FIG. 6.

Referring to FIGS. 1 to 7, during a time period wherein the sensing element 232 is turned on (step S180), the ADC 310 of the touch panel control section 300 converts an analog position value transmitted from the touch panel driving section 200 into a digital position value (step S210), and the MCU 320 of the touch panel control section 300 calculates, e.g., processes, the digital position value to recognize correct contact positions (step S220).

Thus, the touch panel control section 300 transmits information acquired from the MCU 320 to a system 400 driving the liquid crystal panel (not shown) (step S230).

Next, the touch panel control section 300 turns off the sensing elements 232 (step S190).

According to the present exemplary embodiment, when a plurality of touches are generated on the upper substrate 120 of the touch panel 110, unnecessary driving operations of detecting touch positions are omitted by a process of the touch position detection device 500, thereby reducing a required time for detecting the touches. In addition, touched positions may be accurately recognized.

Figure 8:
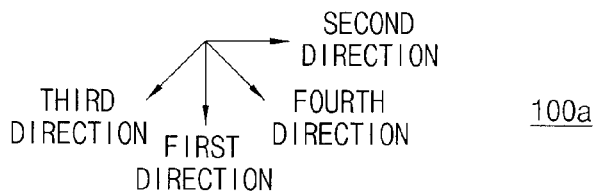
FIG. 8 is a top plan view illustrating another exemplary embodiment of the touch panel included in the touch position detection apparatus according to the present exemplary embodiment.
Figure 8:
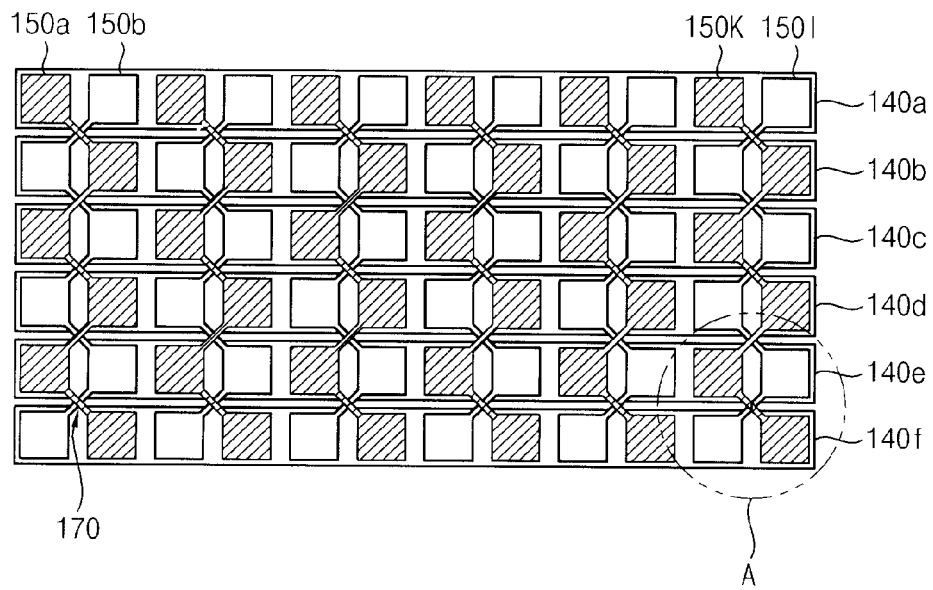

FIG. 8 is a top plan view illustrating another exemplary embodiment of the touch panel 100 included in the touch position detection apparatus 500 according to the present exemplary embodiment.

The first electrodes 140 are arranged in the first direction, substantially similar to the previous exemplary embodiment described with respect to FIG. 4. The plurality of second electrodes 150 corresponding to one of the first electrodes 140 is arranged in the second direction. Thus, the second electrodes 150 corresponding to each of the first electrodes 140 have a matrix shape as seen from a plan view.

In the present exemplary embodiment, a single group consists of a portion of the second electrodes 150 of an odd column and an even column adjacent to the odd column.

Each of the second electrodes 150 of the odd column are not connected to each other in a straight line in the first direction and each of the second electrodes 150 of the even column are not connected to each other in a straight line in the first direction, but each of the second electrodes 150 of the odd column is connected to each of the second electrodes 150 of the even column in a zigzag line by a connection portion 170 as illustrated in detail in FIG. 8.

For example, the hatched second electrode 150a, including hatch-marks extending in a third direction, of the first column of a plurality of second electrodes 150 and corresponding to the first electrode 140a of a first row, is diagonally connected to a hatched second electrode 150a in the second column of a plurality of second electrodes 150 corresponding to the first electrode 140b of the second row by a connection portion 170.

The hatched second electrode 150a of the second column of the plurality of second electrodes 150 corresponding to the first electrode 140b of the second row is diagonally connected to the hatched second electrode 150a of the first column of the plurality of second electrodes 150 corresponding to the first electrode 140c of the third row by the connection portion 170.

In addition, the non-hatched second electrode 150b of the second column of the plurality of second electrodes 150 corresponding to the first electrode 140a of the first row is diagonally connected to the non-hatched second electrode 150b of the first column of the plurality of second electrodes 150 corresponding to the first electrode 140b of the second row by the connection portion 170. The non-hatched second electrode 150b of the first column of the plurality of second electrodes 150 corresponding to the first electrode 140b of the second row is diagonally connected to the non-hatched second electrode 150b of the second column of the plurality of second electrodes 150 corresponding to the first electrode 140c of the third row by the connection portion 170.

Figure 9A:
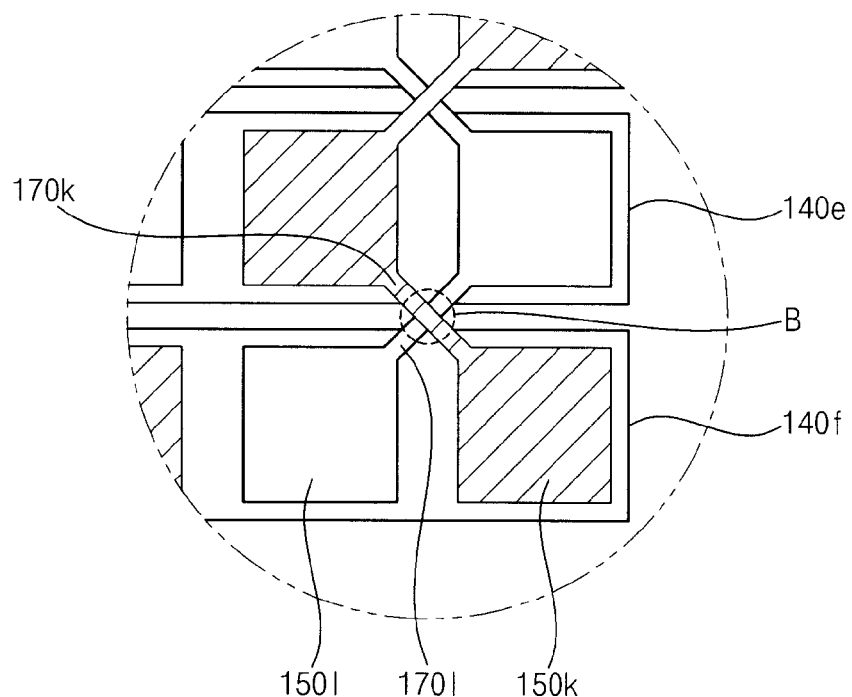
FIG. 9A is an enlarged view illustrating a portion 'A' of FIG. 8.
Figure 9B:
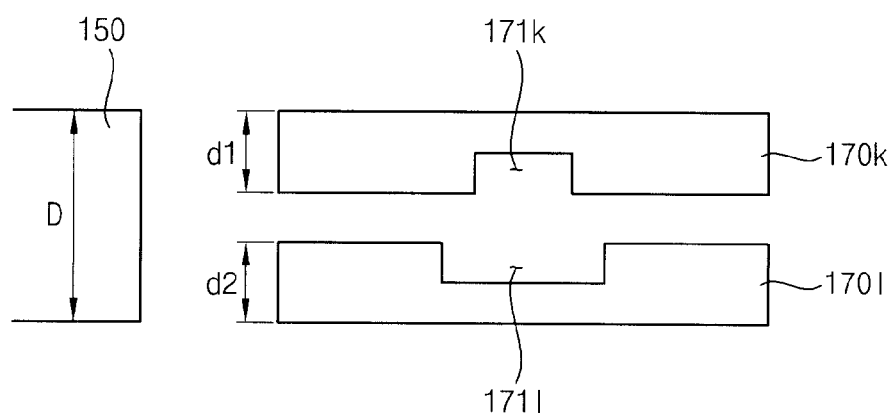
FIG. 9B is an enlarged view illustrating a portion 'B' of FIG. 9A.

FIG. 9A is an enlarged view illustrating a portion 'A' of FIG. 8. FIG. 9B is an enlarged view illustrating a portion 'B' of FIG. 9A.

Referring to FIGS. 8 and 9B, an exemplary embodiment of the connection portion 170 includes a first connection wiring 170k and a second connection wiring 170l. The hatched second electrodes 150k and the non-hatched second electrodes 150l are formed on substantially the same layer, e.g., at a same height about the underlying first electrodes 140a. However, when the first connection wiring 170k and the second connection wirings 170l connect each of the hatched second electrodes 150k and each of the non-hatched second electrodes 150l, the first connection wiring 170k may be formed on a different layer from the second connection wiring 170l.

For example, in one exemplary embodiment, a sum of thicknesses d1 and d2 of the first connection wiring 170k and the second connection wiring 170l may be less than or equal to the thickness D of the second electrodes 150, so that both the first connection wiring 170k and the second connection wiring 170l are formed on substantially the same layer as the second electrodes 150. Thus, while the first connection wiring 170k is formed on a different layer from the second connection wiring 170l, the first connection 170k and the second connection 170l may be formed on substantially the same layer as the second electrode 150.

In such an exemplary embodiment, dispositions of the layers of the first connection wirings 170k connecting the hatched second electrodes 150k and the second connection wirings 170l connecting the non-hatched second electrodes 150l are not limited.

The first connection wiring 170k crosses, e.g., is disposed substantially perpendicular to, the second connection wiring 170l. When the upper substrate 120 is pressed by an external touch, contact between the crossing part of the first connection wiring 170k and the second connection wiring 170l may be avoided in order to prevent shorting between the two. Thus, a concave portion may be formed in the crossing portion of the first connection wiring 170k and in a corresponding portion of the second connection wiring 170l.

In one exemplary embodiment, the size of a first concave portion 171k formed on the first connection wiring 170k may be different from the size of a second concave portion 171l formed on the second connection wiring 170l.

The connection portion 170 may control a resistance according to varying a twisted frequency, a thickness, a width and a shape of the pattern. Thus, the resistance of the connection portion is controlled by controlling the pattern of the connection portion 170, so that the voltage drop when the first electrode 140 and the second electrode 150 are contacted may be optionally set, e.g., predetermined.

In an exemplary embodiment wherein the resistance is set to drop by a certain voltage of about 0.1 V in every row, about 0.1 V is dropped when the second electrode 150 of a unit cell illustrated in FIG. 8 contacts the first electrode 140 and about 0.1 V is dropped when the second electrode 150 of a next unit cell connected by the connection portion 170 is contacted to the first electrode 140. Thus, the voltage may be linearly dropped by about 0.1 V. Alternative exemplary embodiments include configurations wherein the voltage drop may be configured to be greater than or less than about 0.1 V.

Alternative exemplary embodiments include configurations wherein the resistance of the connection portion 170 is set to drop by a voltage of about 0.1 V and a voltage of about 0.2 V in an alternative row. In such an alternative exemplary embodiment, about 0.1 V is dropped when the second electrode 150 of a unit cell is contacted to the first electrode 140 and about 0.2 V is dropped when the second electrode 140 of a next unit cell connected by the connection portion 170 is contacted to the first electrode 140. For example, in one exemplary embodiment the pattern of the connection portion 170 may be changed to drop the voltage in order of about 0.1 V, about 0.2 V, about 0.1 V and about 0.2 V. The resistance according to the change of the pattern of the connection portion 170 is alternately changed, so that a degree by which the voltage is dropped may be changed.

The degree by which the voltage is dropped is controlled according to the connection portion 170, thereby reducing an error range that may be generated when the positions are recognized.

Experimental calculations prove that the touch panel may more efficiently process an error in touch location detection when the resistance is varied according to a certain period rather than when the resistance is constant.

Figure 10:
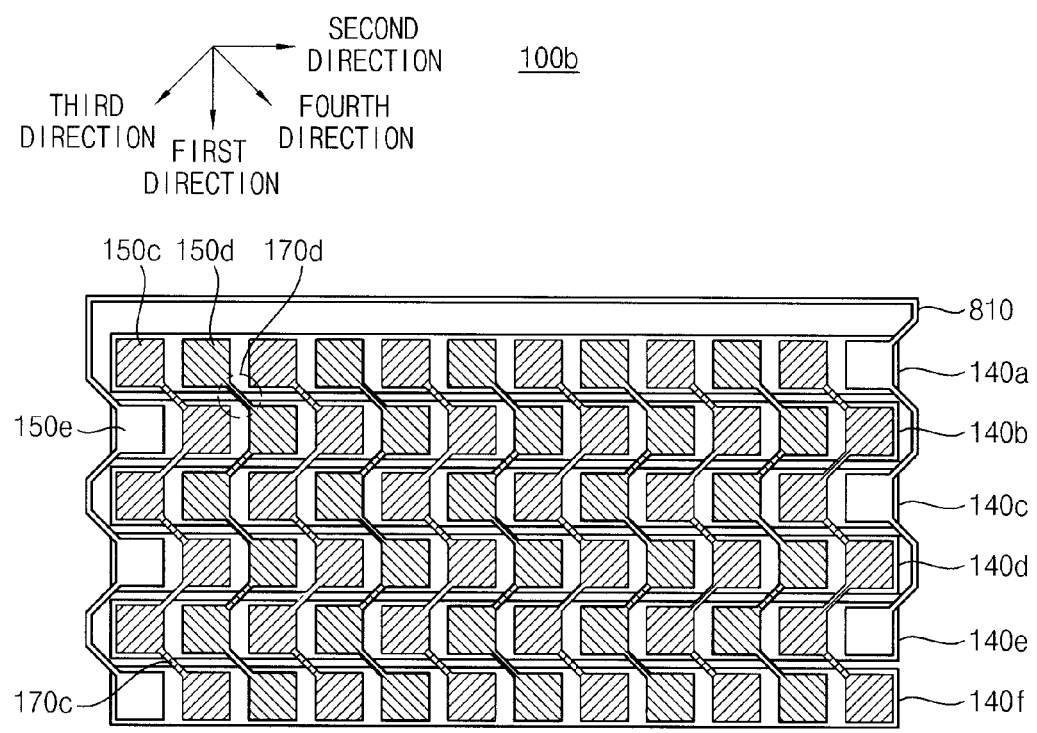
FIG. 10 is a top plan view illustrating still another exemplary embodiment of the touch panel included in the touch position detection apparatus according to the present exemplary embodiment.

FIG. 10 is a top plan view illustrating still another exemplary embodiment of the touch panel included in the exemplary embodiment of a touch position detection apparatus.

Referring to FIG. 10, the touch panel 100 includes a plurality of first electrodes 140 formed on the lower substrate 110 and a plurality of second electrodes 150 formed on the upper substrate 120.

The first electrodes 140 are arranged in the first direction. The second electrodes 150 correspond to one of the first electrodes 140, and are arranged in the second direction. Accordingly, the second electrodes 150 corresponding to each of the first electrodes 140 are arranged in a matrix form in a top plan view.

In such an exemplary embodiment, the second electrodes 150 arranged in the first column of the matrix are not connected to each other, but the second electrodes 150c arranged in the first column are zigzaggingly connected to the second electrodes 150c arranged in the second column adjacent to the first column by a connection wiring 170d. In addition, the second electrodes 150d arranged in the second column are zigzag connected to the second electrodes 150d arranged in the third column adjacent to the second column by a connection wiring 170d.

For example, the second electrode 150c, including hatch marks extending in the third direction, of the first column of a plurality of second electrodes 150 corresponding to the first electrode 140a of the first row is connected to the second electrode 150c of the second column of the plurality of second electrodes 150 corresponding to the first electrode 140b of the second row by the connection wiring 170d. The second electrode 150c of the second column of the plurality of second electrodes 150 corresponding to the first electrode 140b of the second row is connected to the second electrode 150c of the first column of the plurality of second electrodes 150 corresponding to the first electrode 140c of the third row by the connection wiring 170d.

In addition, the second electrode 150d, including hatch marks extending in the fourth direction, of the second column of the plurality of second electrodes 150 corresponding to the first electrode 140a of the first row is connected to the second electrode 150d of the third column of the plurality of second electrodes 150 corresponding to the first electrode 140b of the second row by the connection wiring 170d. The second electrode 150d of the third column of the plurality of second electrodes 150 corresponding to the first electrode 140b of the second row is connected to the second electrode 150d of the second column of the plurality of second electrodes 150 corresponding to the first electrode 140c of the third row by the connection wiring 170d.

However, since the connection wirings 170d and 170d respectively connect each of the second electrodes 150 without crossing with each other, the touch panel 100b of FIG. 10 may not have a crossing portion such as the touch panel 100a of FIG. 8. Thus, the third connection wiring 170d may not include a concave portion such as the first connection wiring 170k and the second connection wiring 170l of FIG. 8.

In addition, the touch panel 100b of FIG. 10 further includes a frame line 810 for connecting the non-hatched second electrodes 150e spaced along an outer portion of the touch panel 100b.

The frame line 810 connects the non-hatched second electrodes 150e remaining after the hatched second electrodes 150c are connected to each other and the hatched second electrodes 150d are connected to each other, by the connection wirings 170d and 170d. Since the remaining non-hatched second electrodes 150e are spaced to be arranged in the outer of the electrode set 100b, the remaining non-hatched second electrode 150e is connected using the frame line 810.

Figure 11:
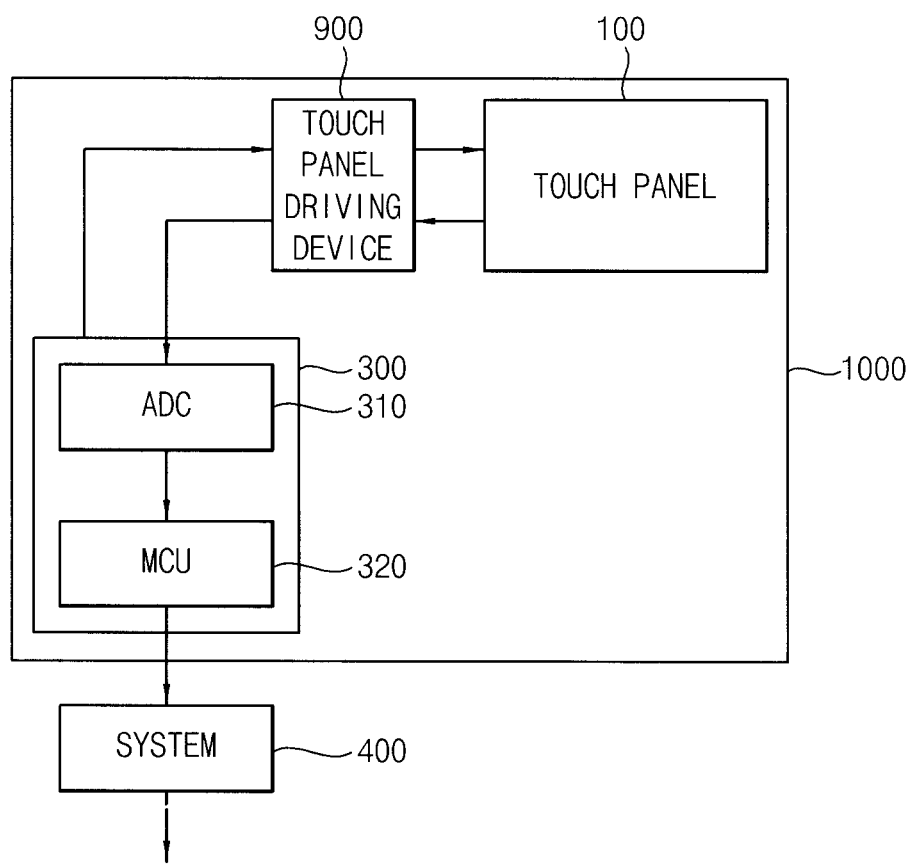
FIG. 11 is a block diagram illustrating another exemplary embodiment of a touch position detection apparatus according to the present invention.
Figure 12:
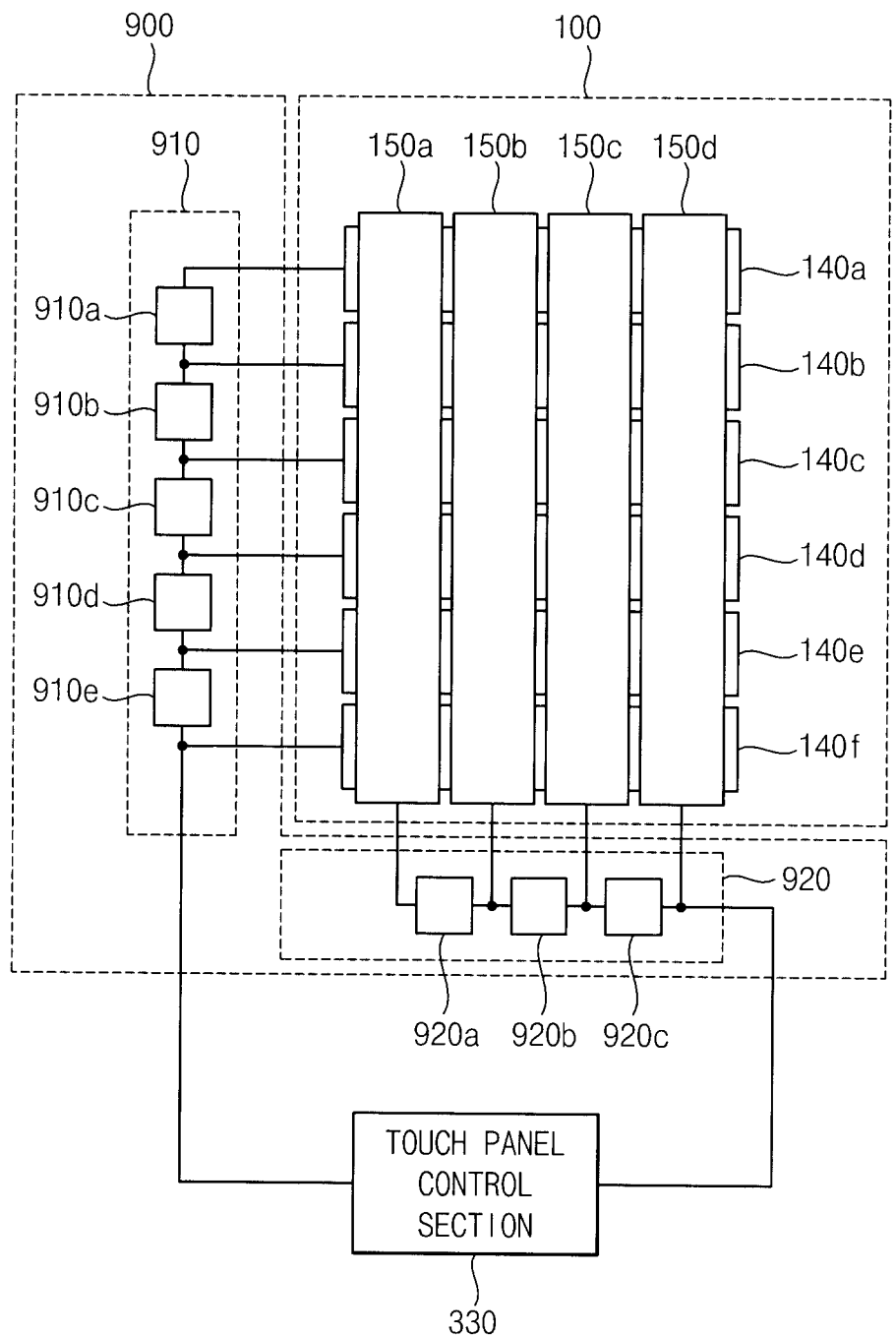
FIG. 12 is a detailed view illustrating an exemplary embodiment of a touch panel driving device connected to a touch panel according to an exemplary embodiment of a touch position detection apparatus of FIG. 11.

FIG. 11 is a block diagram illustrating another exemplary embodiment of a touch position detection apparatus according to the present invention. FIG. 12 is a block diagram view illustrating an exemplary embodiment of a touch panel driving device connected to a touch panel according to FIG. 11.

Since elements of the present exemplary embodiment are substantially the same as elements, including a touch panel 100 of a previous exemplary embodiment, except that the present exemplary embodiment of a touch panel driving device 900 does not have a driving element or a sensing element and receives a pulse instead of a voltage from the touch panel control section 300 to detect touch positions, the same reference numbers in the previous exemplary embodiment are used and a repeated explanation about the same elements will be omitted.

Referring to FIGS. 1, 2, 11 and 12, the present exemplary embodiment of a touch panel driving device 900 includes a lower time delay wiring section 910 and an upper time delay wiring section 920.

In such an exemplary embodiment the touch panel driving device 900 receives a driving pulse (or, a driving signal) instead of a voltage from the touch panel control section 300 to drive the touch panel 100.

In one exemplary embodiment, the lower time delay wiring section 910 may include twisted wirings in a predetermined pattern. Lengths of the twisted wirings in the lower time delay wiring section 910 may be substantially the same as each other or different from each other. For example, in one exemplary embodiment the time delayed according to the lengths of the wirings included in each of the lower time delay wiring section 910 is controlled to be constant or have a predetermined period.

In addition, the lower time delay wiring section 910 is connected between the first electrodes 140, to sufficiently delay the time when the driving pulse is applied to each of the first electrodes 140, thereby sequentially applying the driving pulse to the first electrodes 140.

The upper time delay wiring section 920 includes the twisted wirings in a predetermined pattern. Lengths of the twisted wirings in the upper time delay wiring section 920 may be substantially the same as each other or different from each other. For example, in one exemplary embodiment the time delayed according to the lengths of the wirings included in each of the upper time delay wiring section 920 is controlled to be constant or have a certain period.

In addition, the upper time delay wiring section 920 is connected between the second electrodes 150, to sufficiently delay the time when the driving pulse is applied to each of the second electrodes 150, thereby sequentially applying the driving pulse to the second electrodes 150.

Figure 13:
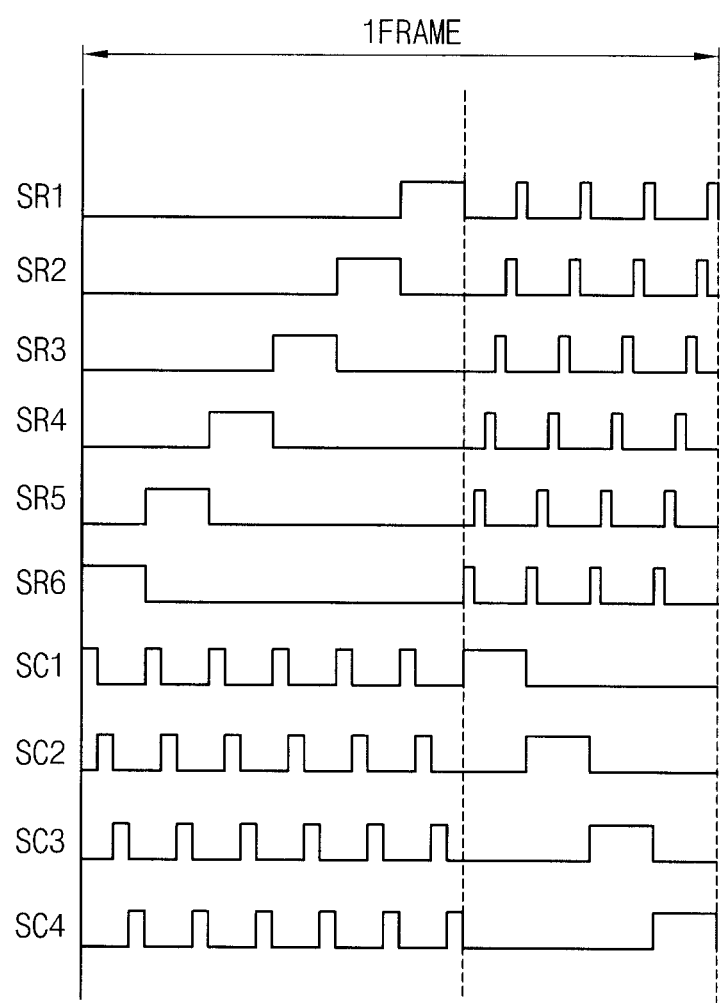
FIG. 13 is a timing diagram illustrating an exemplary embodiment of a driving operation of the exemplary embodiment of a touch panel driving device of FIG. 12.

FIG. 13 is a timing diagram illustrating an exemplary embodiment of a driving operation of the touch panel according to FIG. 12.

Referring to FIGS. 11 to 13, a driving pulse applied from the touch panel control section 330 is first applied to the first electrode 140f of the sixth row.

In addition, before the driving pulse is applied to the first electrode 140e of the fifth row, the driving pulse is delayed by a fifth lower time delay wiring portion 910e disposed between the first electrode 140f of the sixth row and the first electrode 140e of the fifth row by a predetermined time.

In addition, before the driving pulse is applied to the first electrode 140d of the fourth row, the driving pulse is delayed by a fourth lower time delay wiring portion 910d disposed between the first electrode 140e of the fifth row and the first electrode 140d of the fourth row by a predetermined time.

In addition, before the driving pulse is applied to the first electrode 140c of the third row, the driving pulse is delayed by a third lower time delay wiring portion 910c disposed between the first electrode 140d of the fourth row and the first electrode 140c of the third row by a predetermined time.

In addition, before the driving pulse is applied to the first electrode 140b of the second row, the driving pulse is delayed by a second lower time delay wiring portion 910b disposed between the first electrode 140c of the third row and the first electrode 140b of the second row by a predetermined time.

In addition, before the driving pulse is applied to the first electrode 140a of the first row, the driving pulse is delayed by a first lower time delay wiring portion 910a disposed between the first electrode 140b of the second row and the first electrode 140a of the first row by a predetermined time.

Thus, since the lower time delay wiring portion 910 is disposed between two first electrodes 140 in the present exemplary embodiment, five lower time delay wiring sections may be formed on the touch panel 100 having six first electrodes 140. However, the present invention is not limited to five lower time delay wiring sections.

When the driving pulse is applied to the first electrode 140f of the sixth row, the reading pulse is applied to the upper time delay wiring section 920. For example, the touch panel control section 330 applies the reading pulse to the upper time delay wiring section 920, to recognize a potential, e.g., voltage, variation due to a touch on the touch panel 100. Thus, the touch panel control section 330 reads out positions where the potential variations are generated.

The upper time delay wiring section 920 receives the reading pulse from the touch panel control section 330 in as similar method to the lower time delay wiring section 910 to first apply reading pulse to the second electrode 150d of the fourth row.

The reading pulse is delayed by a predetermined time by the third upper time delay wiring section 920c disposed between the second electrode 150d of the fourth row and the second electrode 150c of the third row before being applied to the second electrode 150c of the third row.

In addition, the reading pulse is delayed by a predetermined time by the second upper time delay wiring section 920b disposed between the second electrode 150c of the third row and the second electrode 150b of the second row before being applied to the second electrode 150b of the second row.

In addition, the reading pulse is delayed by a predetermined time by the first upper time delay wiring section 920a disposed between the second electrode 150b of the second row and the second electrode 150a of the first row before being applied to the second electrode 150a of the first row.

Thus, since the upper time delay wiring section 920 is disposed between second electrodes 150, in the present exemplary embodiment three upper time delay wiring section 920 may be formed on the touch panel 100 having four second electrodes 150.

Since an opposite driving sequence to that above, wherein the reading pulse is applied to the lower time delay wiring sections 910, will be performed as described above during a period when the driving pulse is applied to the upper time delay wiring section 920, the explanation about the driving thereof will be omitted.

In the present exemplary embodiment, the touch panels shown in FIGS. 8 and 10 may be employed.

Figure 14:
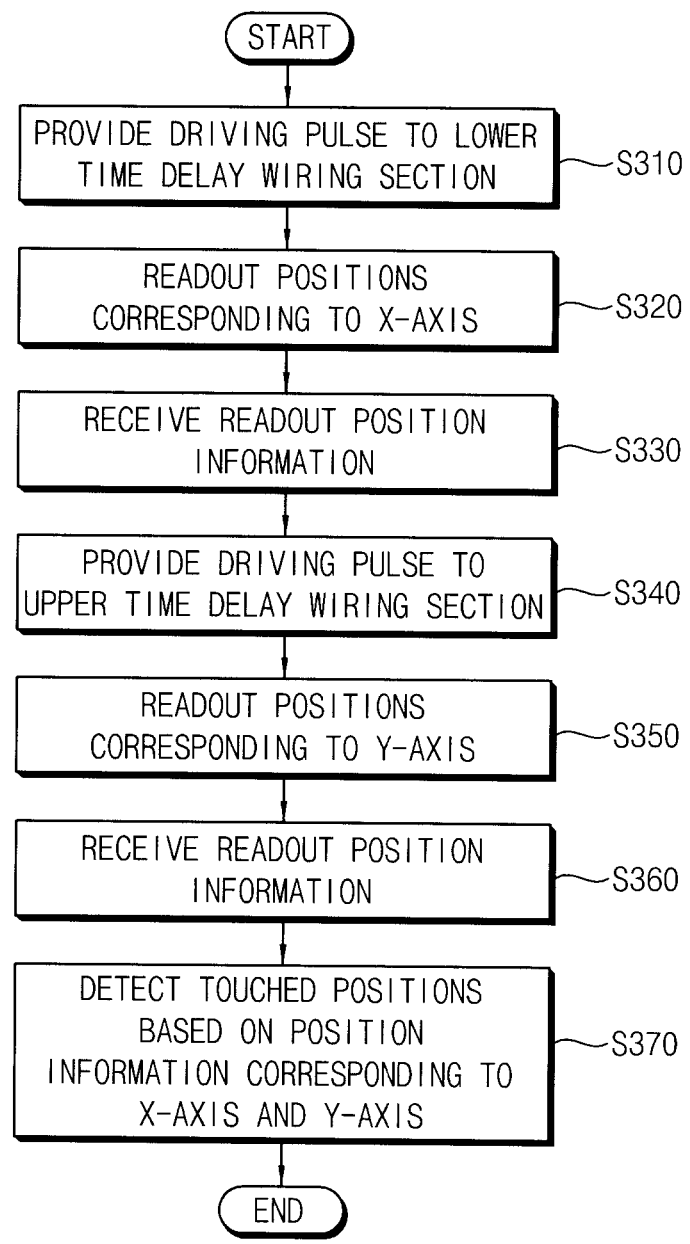
FIG. 14 is a flowchart illustrating an exemplary embodiment of a method of detecting touch positions according to the present exemplary embodiment.

FIG. 14 is a flowchart illustrating an exemplary embodiment of a method of detecting touch positions.

Referring to FIGS. 1, 2, and 11 to 14, the operation of detecting touches generated in the touch panel 100 will be described in further detail.

According to the present exemplary embodiment, when the upper substrate 120 is touched, e.g., pressed by a pen or finger, as described with reference to FIG. 2, the second electrode 150 formed on the upper substrate 120 and the first electrode 140 formed on the lower substrate 110 are contacted. Since a variation of the voltages thereof is generated, the touch panel control section 300 may recognize that the touches are generated.

First, when the touch panel control section 330 recognizes the touches, the touch panel control section 330 provides the driving pulse for driving the touch panel to the lower time delay wiring portion 910 of the touch panel driving device 900 (step S310).

Next, during the driving pulse is sequentially provided to each of the lower time delay wiring portions 910a to 910e, the reading pulse is sequentially applied to the upper time delay wiring portions 920a to 920c connected to the second electrodes 150 formed on the upper substrate 120, thereby reading out a potential variation, e.g., a voltage variation, or a short of multi-touched positions corresponding to the x-coordinate (step S320).

Next, readout position information corresponding to the x-coordinate is provided to the touch panel control section 330 (step S330).

Next, the driving pulse is sequentially provided to each of the upper time delay wiring portions 920a to 920c connected to the second electrodes 150 formed on the upper substrate 110 (step S340).

Next, during the driving pulse is sequentially provided to each of the upper time delay wiring portions 920a to 920c, the reading pulse is sequentially applied to the lower time delay wiring portions 910a to 910e connected to the first electrodes 150 formed on the lower substrate 110, thereby reading out the potential variation, e.g., a voltage variation, or a short of the multi-touched positions corresponding to the y-coordinate (step S350).

Next, readout position information corresponding to the y-coordinate is provided to the touch panel control section 330 (step S360).

Next, the touch panel control section 330 calculates the position information corresponding to the x-coordinate and the y-coordinate to detect the multi-touched positions on the touch panel 100 (step S370).

According to the present exemplary embodiment, when a plurality of touches is generated on the upper substrate 120, the driving pulse and the reading pulse are delayed for a time according to twisted-pattern wirings to be provided from the touch panel control section 300 of the touch position detection apparatus 1000 to the electrodes, thereby reducing unnecessary elements, e.g., timing circuitry, a required time for detecting touch positions and manufacturing costs.

According to the present exemplary embodiment, the lower time delay wiring section 910 is connected to the first electrode 140 to sequentially apply one pulse, to delay an arrival time of the pulse arriving at each of the first electrodes 140. In addition, the upper time delay wiring section 920 is connected to the second electrode 150 to sequentially apply one pulse, to delay the arrival time of the pulse arriving at each of the second electrodes 150.

However, exemplary embodiments include configurations wherein an order in which the lower time delay wiring section 920 is connected to each of the first electrodes 140 is optionally changed and the order in which the upper time delay wiring section 910 is connected to each of the first electrodes 140 is optionally changed, without changing length of the wirings in the lower time delay wiring section 910 and the upper time delay wiring section 920, thereby delaying the arrival time of the pulse.

A touch panel driving device 900 according to the present exemplary embodiment sequentially applies one pulse provided from the touch panel control section 330 to the electrodes 140 and 150 according to a time delay of the pulse. Only a layout of a wiring is changed without using a switching element, etc to delay a time when the pulse is approached to the electrodes, thereby reducing a cost associated with the touch panel 100.

As described above, according to the present invention, a driving voltage and a reading voltage are sequentially applied to a plurality of first electrodes and a plurality of second electrodes, thereby accurately recognizing multi-touched positions when a touch panel is simultaneously touched in multiple locations, e.g., multi-touched.

In addition, only a layout of wirings connected to the first electrodes and the second electrodes is changed to delay pulses applied to the first electrodes and the second electrodes by a certain time, thereby reducing unnecessary elements to reduce manufacturing costs thereof.

In addition, a voltage is not applied to the first electrodes and the second electrodes, but a pulse is applied to the first electrodes and the second electrodes to readout values in x-axis and y-axis at substantially the same time, thereby reducing a driving time and accurately recognizing multi-touches.

In addition, since an exemplary embodiment of a touch panel according to the present invention rapidly recognizes touched positions as compared to a conventional touch panel, a response time may be reduced.

Accordingly, when a plurality of touches is generated, the touched positions during the same time may be accurately recognized.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A method of detecting touch positions, the method comprising:
   providing an external power voltage which drives a resistive-type touch panel;
   sequentially turning on a plurality of lower driving elements connected to the touch panel;
   turning on a plurality of upper driving elements connected to the touch panel to readout at least one multi-touched position corresponding to an x-coordinate, while each of the lower driving elements is turned on;
   receiving readout position information corresponding to the x-coordinate;
   sequentially turning on at least one of the upper driving elements connected to the touch panel;
   turning on the plurality of lower driving elements connected to the touch panel to readout the at least one multi-touched position corresponding to a y-coordinate, while each of the upper driving elements is turned on;
   receiving readout position information corresponding to the y-coordinate;
   turning on a sensing element; and
   turning off the sensing element,
   wherein the resistive-type touch panel comprise
   a plurality of first electrodes arranged in a first direction on a lower substrate; and
   a plurality of second electrodes arranged in a second direction on an upper substrate, each of the second electrodes of an odd column being connected to each of the second electrodes of an even column in a zigzag line by a connection portion having a thickness less than that of the second electrodes, and
   wherein each of the lower driving elements is connected to each of the first electrodes, and each of the upper driving elements is connected to each of the second electrodes, and
   wherein each of the second electrodes overlaps one of the first electrodes.

2. The method of claim 1, wherein turning on the sensing element comprises:
   converting the readout position information corresponding to the x-coordinate and the readout position information corresponding to the y-coordinate into at least one digital position value;
   processing the at least one digital position value to obtain the at least one multi-touched position; and
   transmitting the at least one multi-touched position to a system which controls the driving of a display panel disposed below the touch panel.

3. A touch position detection apparatus comprising:
   a resistive-type touch panel comprising:
   a lower substrate including a plurality of first electrodes arranged in a first direction;

an upper substrate including a plurality of second electrodes arranged in a second direction substantially perpendicular to the first direction, each of the second electrodes of an odd column being connected to each of the second electrodes of an even column in a zigzag line by a connection portion having a thickness less than that of the second electrodes; and a plurality of spacers disposed between the lower substrate and the upper substrate; and a touch panel driving device comprising:

a driving element part which drives the plurality of first electrodes and the plurality of second electrodes; and a sensing element part which senses at least one touch performed on the touch panel in response to the driving element part, wherein the sensing element part sequentially reads out voltages of the plurality of second electrodes while each of the plurality of first electrodes is driven, and the sensing element part sequentially reads out voltages of the plurality of first electrodes while each of the plurality of second electrodes is driven, wherein each of the second electrodes overlaps one of the first electrodes.

4. The touch position detection apparatus of claim 3, wherein the driving element part comprises:

a plurality of lower driving elements respectively connected to the plurality of first electrodes arranged in the first direction; and a plurality of upper driving elements respectively connected to the plurality of second electrodes arranged in the second direction.

5. The touch position detection apparatus of claim 3, wherein the sensing element part comprises:

a sensing resistor; and a sensing element which maintains a low voltage while the at least one touch is sensed by the driving element part and which maintains a high voltage after the at least one touch is sensed by the driving element part.

6. The touch position detection apparatus of claim 3, further comprising:

a touch panel control section which controls the touch panel driving device to sequentially drive the plurality of first electrodes and the plurality of second electrodes, wherein the touch panel control section comprises:

an analog-to-digital converter which converts an analog position value received from the touch panel driving device into a digital position value; and a microcontroller which processes the digital position value received from the ADC to detect at least one touch position.

7. A method of detecting touch positions, the method comprising:

providing a driving pulse which drives a resistive-type touch panel to a lower time delay wiring portion connected to the touch panel;

providing a first reading pulse to an upper time delay wiring portion connected to the touch panel during a time interval in which the driving pulse is provided to the lower time delay wiring portion;

receiving readout position information corresponding to an x-coordinate according to the first reading pulse;

providing the driving pulse to the upper time delay wiring portion connected to the touch panel in response to the readout position information corresponding to the x-coordinate;

providing a second reading pulse to the lower time delay wiring portion connected to the touch panel during a time interval in which the driving pulse is provided to the upper time delay wiring portion;

receiving readout position information corresponding to a y-coordinate according to the second reading pulse; and calculating position information corresponding to the x-coordinate and the y-coordinate to detect at least one touch position, wherein the resistive-type touch panel comprise a plurality of first electrodes arranged in a first direction on a lower substrate; and a plurality of second electrodes arranged in a second direction on an upper substrate, each of the second electrodes of an odd column being connected to each of the second electrodes of an even column in a zigzag line by a connection portion having a thickness less than that of the second electrodes, and wherein the lower time delay wiring portion is connected to each of the first electrodes, and the upper time delay wiring portion is connected to each of the second electrodes, wherein each of the second electrodes overlaps one of the first electrodes.

8. A touch position detection apparatus comprising:

a resistive-type touch panel comprising:

a lower substrate including a plurality of first electrodes arranged in a first direction;

an upper substrate including a plurality of second electrodes arranged in a second direction, each of the second electrodes of an odd column being connected to each of the second electrodes of an even column in a zigzag line by a connection portion having a thickness less than that of the second electrodes; and a plurality of spacers disposed between the lower substrate and the upper substrate;

a touch panel driving device comprising:

a plurality of delay wiring parts which delay a driving pulse applied to each of the plurality of first electrodes and the plurality of second electrodes to sequentially drive the plurality of first electrodes and the plurality of second electrodes; and a touch panel control part which applies the driving pulse to the touch panel driving device, wherein each of the second electrodes overlaps one of the first electrodes.

9. The touch position detection apparatus of claim 8, wherein the plurality of delay wiring parts comprise:

a plurality of lower time delay wiring portions connected to the plurality of first electrodes; and a plurality of upper time delay wiring portions connected to the plurality of second electrodes.

10. The touch position detection apparatus of claim 9, wherein the plurality of lower time delay wiring portions and the plurality of upper time delay wiring portions comprise a plurality of twisted pattern wirings, and the plurality of twisted pattern wirings are sequentially connected to the plurality of first electrodes and the plurality of second electrodes to sequentially delay the driving pulse applied to the plurality of first electrodes and the plurality of second electrodes.

11. The touch position detection apparatus of claim 9, wherein the plurality of lower time delay wiring portions and the plurality of upper time delay wiring portions comprise a plurality of twisted pattern wirings, and the plurality of twisted pattern wirings are randomly connected to the plurality of first electrodes and the plurality of second electrodes to randomly delay the driving pulse applied to the plurality of first electrodes and the plurality of second electrodes.

* * * * *